Feb. 13, 1968   C. N. FRENCH ETAL   3,368,586
ACCUMULATOR
Filed Sept. 1, 1965

INVENTORS
CHARLIE N. FRENCH
THOMAS M. JULOW
BY
Richard G. Geib
ATTORNEY 3,368,586
ACCUMULATOR
Charlie N. French and Thomas M. Julow, South Bend, Ind., assignors to The Bendix Corporation, a corporation of Delaware
Filed Sept. 1, 1965, Ser. No. 484,229
6 Claims. (Cl. 138—30)

ABSTRACT OF THE DISCLOSURE

A clamping ring for joining a bladder to an end structure of an accumulator which closes the space between the end structure and the outer shell of the accumulator except for minute passages through the ring permitting fluid flow so as to prevent extrusion of the bladder because of internal pressure.

*Related applications*

This patent is related to accumulators such as is shown by copending patent application Ser. No. 373,344 filed by the common assignee June 8, 1964, which has issued as U.S. Patent No. 3,283,786.

This invention relates to a hydropneumatic energy storing device and more specifically to improvements in an accumulator of the bladder type.

Prior to the advent of this invention, accumulators with good operating characteristics were relatively expensive to fabricate or were too bulky or heavy. Those which were somewhat cheaper to fabricate often did not function properly, or were short lived.

It is a principal object of this invention to provide a practical, inexpensive, lightweight accumulator which is capable of extended life beyond those presently in existence.

It is a more particular object of this invention to provide an accumulator with an anti-extrusion means which will prevent scoring of a bladder for an accumulator of the type aforementioned due to repeated pressure fluctuation within the bladder caused by the variance in internal and external pressures during the operation of actuating means associated therewith.

Other objects and advantages of the present invention will appear to those skilled in the art to which it relates from an observation of the description of the drawings in which.

Figure 1:
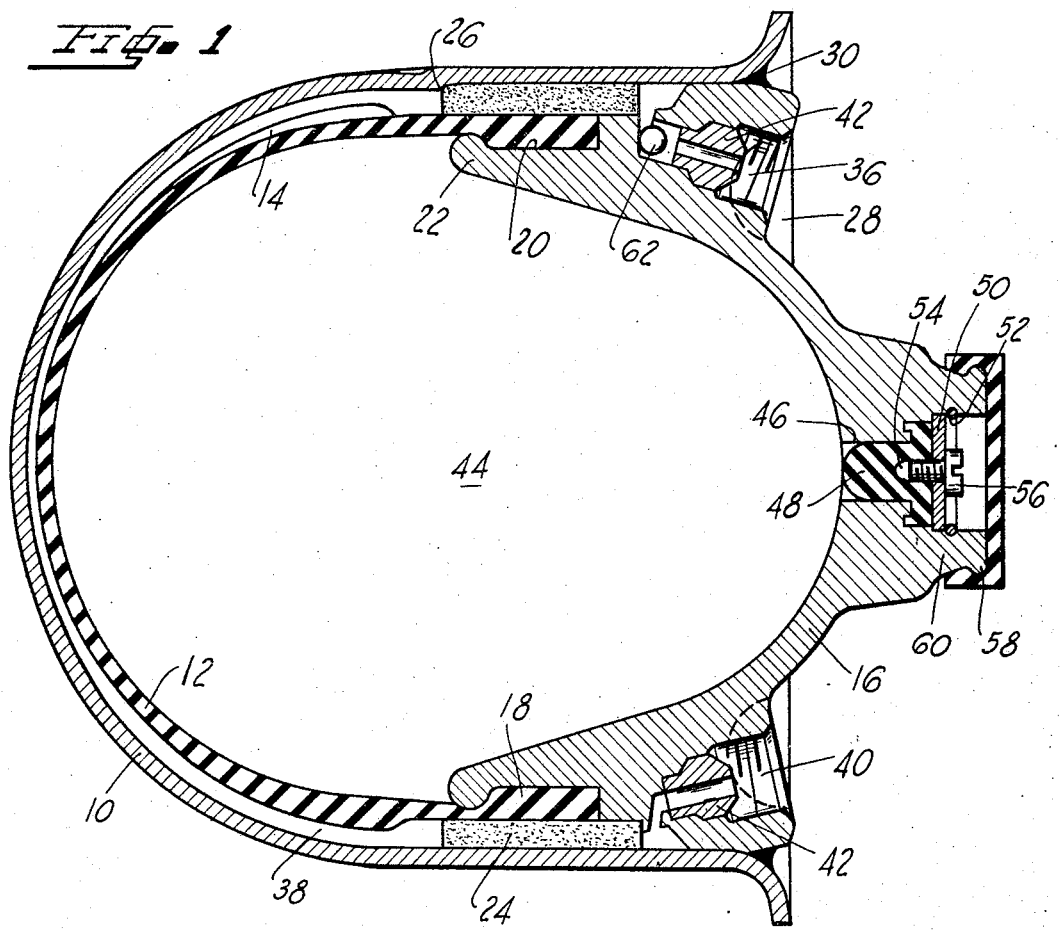
FIGURE 1 is a cross sectional view of an accumulator in accordance with the principles of our invention.

More particularly, with regard to FIGURE 1, we have shown an accumulator having an outer shell 10 and a bladder 12 within the shell and spaced from the inner walls thereof to permit fluid flow therebetween. In addition, the bladder may or may not have a plurality of reinforcement ribs 14 therearound.

The bladder 12 is held on an end closure 16 by the insertion of the peripheral bead 18 adjacent the mouth of the bladder into a groove 20 provided on the inwardly projecting ring 22 of the end structure 16. A clamping ring 24 having a cross sectional area which is designed to compress the peripheral bead 18 and completely fill the space between the bladder, end structure and outer shell 10 is expanded, as by applying heat thereto, and inserted over the bladder and end structure to unite the bladder and end structure. Thereafter the end structure and bladder assembly is inserted within the outer shell 10 until the clamping ring abuts indentations 26 located a predetermined depth in from the open end 28 of the outer shell 10. Thereafter the end structure is welded as at 30 about the periphery thereof to the mouth 28 of the outer shell 10. It should be understood that threads may be provided adjacent the mouth of the shell and on the end structure and that the two parts may be threaded together with an appropriate seal means located therebetween as may be observed in a copending application Ser. No. 373,344 aforementioned.

Figures 2, 3:
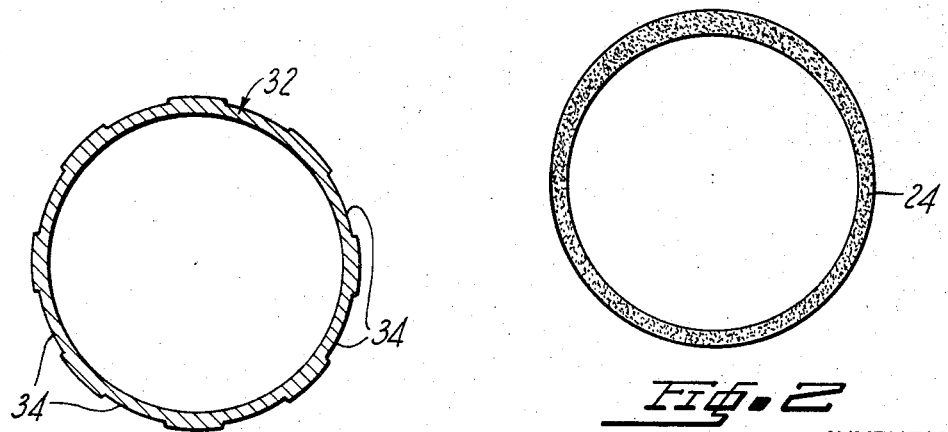
FIGURE 2 is an end view of a porous ring as may be seen in FIGURE 1 for holding the bladder to an end structure in accordance with the principles of our invention.
FIGURE 3 is an end view of a notched ring which may be substituted for the porous ring of FIGURE 2 in the location as seen in FIGURE 1 to prevent extrusion of the bladder in accordance with the principles of our invention.

With reference to FIGURE 3 the porous ring 24 may have substituted therefor, a ring 32 having a plurality of notches 34 therearound, and the assembly of the bladder to the end structure 16 would be in a similar manner aforedescribed.

It should be noted that the notches 34 provide a very limited flow communication path between the outer shell 10 and the clamping ring 32.

The end closure 16 is also provided with a fluid inlet 36 for receipt of fluid from a pump (not shown). The fluid then flows through the pores of the clamping ring 24 or through the notches 34 of the clamping ring 32, as the case may be, to the space 38 between the bladder 12 and the outer shell 10. After flowing into the space and around the bladder the fluid is then exhausted through the pores of the porous ring 24 or the notches of the ring 32 diametrically opposite the inlet 36 to a fluid outlet port 40. Appropriate fittings 42 are provided in the inlet and outlet ports 36 and 40, respectively, to meet with fittings attaching conduits from a pump and to an actuator (not shown) as may be readily familiar to those skilled in the art to which our invention relates.

In order to inject a pressurized fluid into a chamber 44 interiorly of the bladder 12, we have provided a drilled opening 46 in the end structure 16 which we have closed by a rubber or similar resilient lug 48 that is held in the drilled opening by means of a washer 50 and snap ring 52. As seen, the plug 48 is partially drilled, as at 54, for the receipt of a hollow needle (not shown) that is inserted to the plug 48 after the closing set screw 56 has been removed to charge the chamber 44. Upon removal of the hollow needle, the plug 48 will close off the chamber 44 and the set screw 56 is re-threaded through the washer 50 into the opening 54 to further insure sealing thereof. Thereafter, a cover 58 is snap-fitted over the raised boss 60 receiving the plug 48 of the end structure 16 to prevent contaminants from entering the opening.

In order to prevent leakage of the fluid within the space 38 of the accumulator back towards the pressure supplying means which may or may not be in the form of the pump, as abovementioned, we have provided a ball check valve 62 adjacent the fitting 42 in the inlet port 36. This check valve, which could be biased by a spring (not shown) is designed so that the pump supplying pressure to the inlet 36 has an unrestricted passage going into the space 38 and will, as is readily obvious, allow the accumulator to function regardless of pressure supply failure. As an additional safety factor one could design the plugs 48 to be made of a heat dissolvable plastic that is set to melt at a predetermined temperature to prevent explosion of the accumulator such as has been known to occur when accumulators of this type have been exposed to a fire.

The porous ring 24 or the notched ring 32 will provide flat abutment surfaces for the expansion of the accumulator 12 toward the openings 36 or 40 as would occur upon the fluctuation in pressure between the chamber 44 and the space 38 during operation of associated devices attached to the accumulator. It has been known that such fluctuation of the bladder 12 has in the past extruded the bladders upwardly past the end structures scoring the edges of the bladder so that after a limited amount of fluctuation a weakened bladder will explode to commingle the chamber 44 and the space 38. By the use of a porous ring 24 or a notch ring 32 this scoring of the surfaces of the bladder and subsequent weakening of same is prevented.

As the operation of the accumulator can be readily understood from the foregoing description, we do not think it necessary to go through further explanation at this time.

As other modifications may well be employed, such as a ring having a plurality of limited diameter drilled openings therethrough (not shown) may be employed to practice the principles of our invention, we do not wish to be limited by the foregoing description, but rather by the scope of the appended claims.

We claim:

1. A pressure accumulator comprising:
   an outer shell open at one end;
   a bladder of resilient deformable material, said bladder having a mouth;
   an end structure fitting within the mouth of said bladder, said end structure being provided with openings one of which leads to the interior of said bladder behind said end structure and another of which leads to the area surrounding said bladder and said end structure; and
   ring means clamping said bladder to said end structure, said ring means having minute passages and substantially closing the space between the outer shell and said bladder and end structure when said bladder and end structure are inserted into said outer shell, said ring means being adjacent to said another of which openings in said end structure, said ring means providing an abutment surface preventing extrusion of said bladder toward said another of which openings of structure; and 2. A pressure accumulator according to claim 1 wherein said ring means clamping said bladder to said end structure is in the form of a porous annular ring which provides a continuous flat abutting surface between the bladder and the outer shell on which exterior surfaces of the bladder may rest when internal pressure is supplied by said second opening is greater than pressure supplied exteriorly of said bladder through said another of which openings to thereby prevent extrusion of said bladder toward said another of which openings that is in said end structure adjacent the open end of said outer shell.

3. A pressure accumulator comprising:
   an outer shell open at one end;
   a bladder of resilient deformable material, said bladder having a mouth;
   an end structure affixed to the open end of said outer shell and having an inwardly projecting ring received in the mouth of said bladder, said end structure also having first, second and third openings therein with said first and third openings leading to peripheral outlets in said end structure and said second opening leading to the interior of said bladder;
   a valve means adapted to allow flow in one direction only through said first opening in said end structure;
   a plug positioned in said second opening of said end structure forming a one-way check valve permitting fluid insertion into said bladder and preventing the expulsion therefrom; and
   a porous clamping ring about the exterior of said bladder joining said bladder to said end structure and completely filling the space between the end structure, bladder and the outer shell to provide an abutment surface which will prevent extrusion of said bladder toward the open end of said outer shell.

4. A pressure accumulator comprising:
   an outer shell open at one end;
   a bladder of resilient deformable material, said bladder having a mouth;
   an end structure affixed to the open end of said outer shell and having an inner projecting ring received in the mouth of said bladder, said inner projecting ring having a groove therearound for receiving peripheral bead of said bladder adjacent the mouth thereof; and
   a clamping means holding the peripheral bead at the mouth of said bladder inwardly into the groove of the projecting ring of said end structure, said clamping means in the form of a ring having limited flow passages therethrough to prevent extrusion of said bladder beyond said ring; and
   an appropriately located indentation in said outer shell limiting the inward position of said clamping means to locate the depth of the assembled end structure and bladder in said outer shell.

5. A pressure accumulator according to claim 4 wherein said clamping means is in the form of the porous ring having a flat abutment surface preventing the extrusion of said bladder beyond said end structure.

6. A pressure accumulator according to claim 4 wherein said clamping means is in the form of a ring having a plurality of notches on the periphery thereof whose area is such as will prevent extrusion of said bladder beyond the clamping ring.

References Cited

UNITED STATES PATENTS

| 1,875,732 | 9/1932 | Holttum | 138—30 |
| 2,246,667 | 6/1941 | Colman | 138—30 X |
| 2,349,321 | 5/1944 | White | 138—30 |
| 2,550,892 | 5/1951 | Weber et al. | 138—30 |
| 2,861,595 | 11/1958 | Pier | 138—30 |
| 2,880,759 | 4/1959 | Wisman | 138—30 |
| 2,893,433 | 7/1959 | MacDuff | 138—30 |
| 3,211,184 | 10/1965 | Greer | 138—30 |
| 3,276,477 | 10/1966 | Bleasdale | 138—30 |
| 3,276,478 | 10/1966 | Bleasdale | 138—30 |
| 3,283,786 | 11/1966 | Irwin | 138—30 |
| 3,140,085 | 7/1964 | De Carbon | 138—30 X |
| 3,188,796 | 6/1965 | French et al. | 60—10.5 |

FOREIGN PATENTS

| 639,701 | 7/1950 | Great Britain. |
| 979,609 | 1/1965 | Great Britain. |

SAMUEL ROTHBERG, *Primary Examiner.*

N. C. CUDDEBACK, *Assistant Examiner.*